ACCESSORY APPARATUS FOR CONVERSION OF A SCREEN PICTURE INTO A THREE-DIMENSIONAL VIRTUAL IMAGE

Filed May 2, 1966 6 Sheets-Sheet 1

INVENTORS
Erich Zipse &
Wilhelmine Zipse
BY
Otto John Munz.
ATTORNEY

INVENTORS
Erich Zipse &
Wilhelmine Zipse
BY
Otto John Munz
ATTORNEY

ACCESSORY APPARATUS FOR CONVERSION OF A SCREEN PICTURE
INTO A THREE-DIMENSIONAL VIRTUAL IMAGE
Filed May 2, 1966 6 Sheets-Sheet 3

INVENTORS
Erich Zipse &
Wilhelmine Zipse
BY
Otto John Munz
ATTORNEY

INVENTORS
Erich Zipse &
Wilhelmine Zipse
BY
Otto John Mungo
ATTORNEY

INVENTORS
Erich Zipse &
Wilhelmine Zipse
BY
Otto John Munz
ATTORNEY

INVENTORS
Erich Zipse &
Wilhelmine Zipse
BY
Otto John Munz
ATTORNEY

United States Patent Office 3,536,832
Patented Oct. 27, 1970

3,536,832

ACCESSORY APPARATUS FOR CONVERSION OF A SCREEN PICTURE INTO A THREE-DIMENSIONAL VIRTUAL IMAGE

Erich Zipse and Wilhelmine Zipse, both of Lessingstr. 12, Baden-Baden, Germany

Filed May 2, 1966, Ser. No. 546,852
Int. Cl. H04n 5/64
U.S. Cl. 178—7.81 5 Claims

ABSTRACT OF THE DISCLOSURE

An accessory apparatus for conversion of a screen picture into a three-dimensional virtual viewers image output comprising a housing including a cradle for a screen, an optical system, means to align said optical system optically with the center of housing said relatively to the proposed viewing positions of expected viewers; means to project the said picture upon a concave mirror in optical alignment with and reflecting toward the viewer's position; means to change the said optical alignment, said optical system comprising means to locate optically the said virtual image behind and spaced a distance from said mirror within an imaginary plane intersecting with the plane of said mirror, said distance being determined by the radius of concavity of said mirror and by the distance of said mirror from said screen to create a desired three-dimensional depth effect.

BACKGROUND OF THE INVENTION

Field of the the invention

This invention concerns an apparatus for the three-dimensional reproduction of television pictures.

Description of the prior art

It is known that pictures which are viewed at a certain distance by means of a concave mirror have a three-dimensional characteristic. This characteristic is similar to the effect produced in stereoscopic viewing of pictures, wherein, however, two somewhat relatively displaced pictures are required which can be observed by means of a double optical arrangement. In viewing pictures by means of a concave mirror a natural three-dimensional effect is already present.

SUMMARY OF THE INVENTION

Devices are already known by means of which transparencies and films projected on to screens can be viewed three-dimensionally. In general, cylindrically formed mirrors are used, the width distortion caused by the reflection being compensated by a counteracting optical distortion of the image produced. Such mirrored images, however, do not have a sufficiently three-dimensional effect.

Attempts have therefore been made to produce the three-dimensional effect by a double reflector arrangement, both mirrors being cylindrically curved and one mirror is arranged displaced relative to the other through 90°. It has already been proposed for the second mirror to be elliptical instead of cylindrical but to give it an outline. These already known devices require a comparatively large mirror surface however. In addition to this, due to the double reflection increased loss of light occurs. Finally, when the image is viewed from the side, the picture is very quickly lost from the field of vision of the viewer on account of the double reflection.

It has also been proposed to view images in parabolic concave mirrors. In this case, however, distortions occur relative to the centre, particularly at the edges, which can only be compensated by an optical system.

In the production of television images, it has already been proposed to produce the image on a cylindrically curved surface and to view it by means of a mirror which has a parabolic or hyperbolic curvature in one direction. However, such an arrangement necessitates the manufacture of a new tube and is thus comparatively expensive. Moreover, it is not possible to achieve a completely three-dimensional effect by this arrangement.

The object of this invention is to provide an apparatus for the three-dimensional reproduction of television images which is suitable in a very high degree for the already existing ordinary commercial television receivers and which therefore represents a simple and valuable addition to these receivers. In addition, a more brilliant, larger and three-dimensional image having the same good clarity is hoped to be achieved by the apparatus.

Other objects and many of the attendant advantages of the present invention will become obvious to those skilled in the art as the disclosure is made in the following description of preferred embodiments of the invention.

According to the present invention the length of the rectangle of the concave mirror is preferably greater than the width of the screen, whereby viewers sitting somewhat to the side can obtain a perfect view of the picture. It is particularly advisable to select the radius of curvature of the spherical surface of the mirror proportionate to the diagonal of the screen. This ratio of the radius of curvature of the spherical surface of the mirror to the diagonal of the tube can be constant and amount preferably to approximately 10:1 to 3:1. Finally, the ratio of the height of the mirror to the width thereof may also amount to approximately 3:4 to 1:3.

The image viewed with the apparatus according to this invention has the surprising effect that no lines are visible whilst a good degree of clarity or sharpness is retained, also the picture becomes increasingly larger with increasing distance from the mirror so that the viewer always has the same impression of the image. It has become apparent that, particularly in the case of color television, the colors have a more three-dimensional and brilliant effect. The apparatus according to the invention can also be attached to any table television receiver by a simple obvious means.

Figure 1:
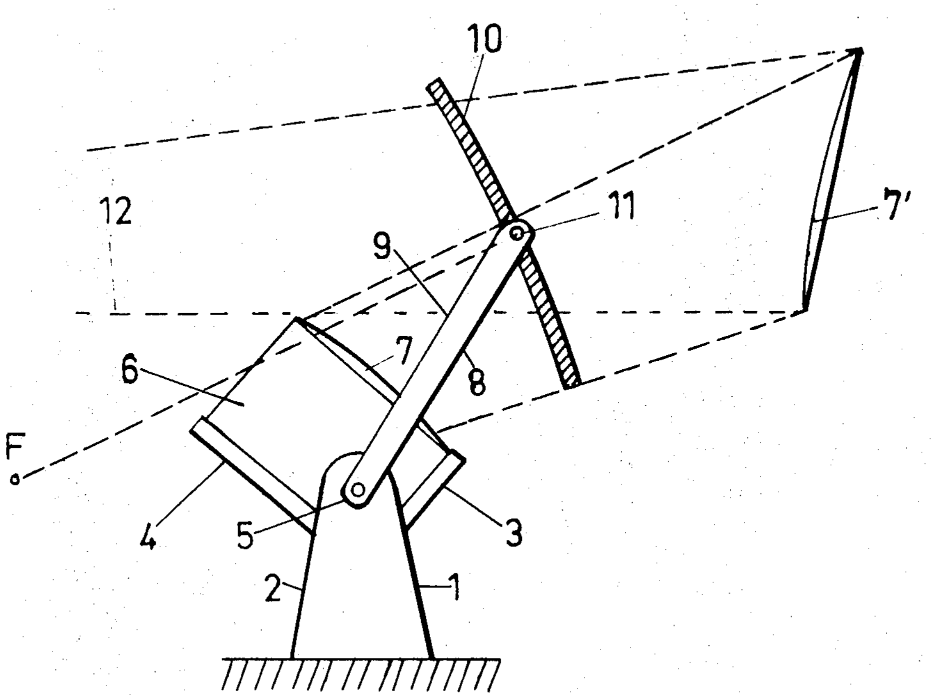
FIG. 1 is a side view and FIG. 2 a cross sectional view both including optical diagrammatic views of one embodiment of the apparatus of the invention.

In FIG. 1 the frame consists of two side supports 1 and 2, within which two walls 3 and 4 arranged at right angles to each other are pivotable and lockable about an axis 5. The television receiver 6 having a screen 7 is mounted on the walls 3, 4 arranged at right angles to each other. In addition, two arms 8, 9 which can be pivoted about the side supports 1 and 2 are secured to said side supports. Connected to the two arms 8 and 9 is the concave mirror 10 which can also be pivoted about the axes 11 relative to the arms 8, 9.

As may be seen from the arrangement illustrated in FIG. 1, a visible virtual image 7′ of the screen 7 is produced having an assumed focal point F in the mirror 10 in accordance with the given ray path. This image can be observed by a viewer sitting at a distance within the ray path 12 shown in broken lines.

Figure 2:
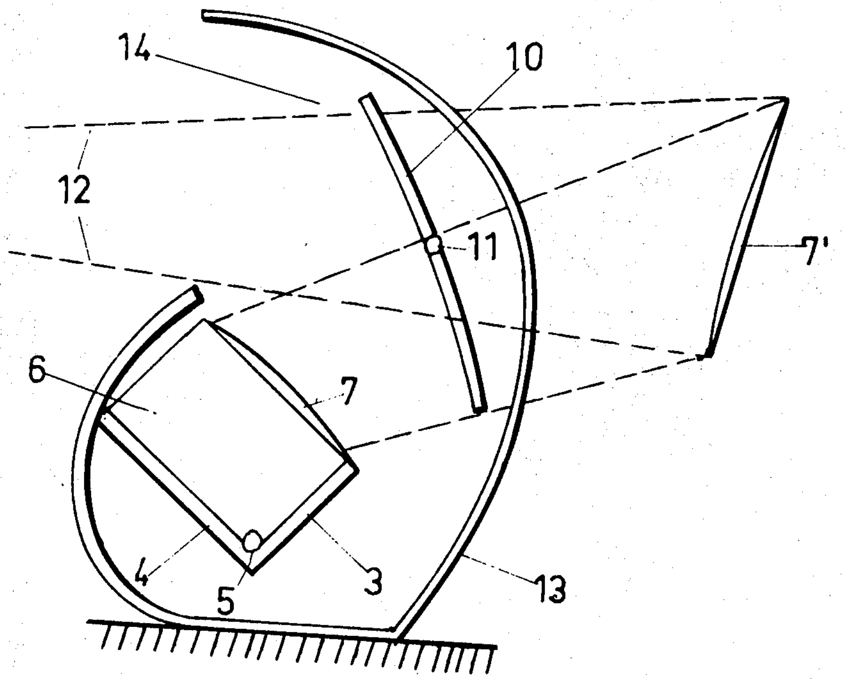

As shown in FIG. 2, the two supports 3 and 4 for the television receiver 6 and the mirror 10 are accomplished within a closed casing 13 and journalled to rotate about the axes 5 and 11, respectively. The closed casing 13 has a viewing aperture 14 at the front in which the virtual image 7′ on the screen 7 can be observed within the ray path 12. Naturally, the arrangement according to FIG. 3 can also be reversed in such manner that the television receiver 6 is above and the mirror 10 below. In order to adjust the required angle the two axes 5 and 11 may extend outwardly and be provided with knobs.

The distance between the screen and the concave mirror may be adjusted and will usually lie within the distance of the focal point from the surface of the mirror. In order to obtain an undistorted reflection within the stated dimensions, it is advisable to use a mirror having a comparatively large radius of curvature. In normal viewing rooms mirrors having a radius of curvature of up to 5 m. and more may be used. The mirror itself may consist of any desired material, such as glass, metal, synthetic resin or a specially cast composition, a feature of which is dealt with in greater detail hereinafter.

In order to obtain a comparatively wide view of the image in the mirror, the latter is made relatively wide. Naturally, the mirror may also be provided with surface fluting in known manner permitting viewing of the image within large angles.

The reversal of the sides of the television receiver produced by the mirror can be compensated by simply reversing the scanning direction in the receiver. For this purpose it is only necessary to change over the line sweep in the television receiver or to fit the receiver with a change-over switch, normal viewing and viewing in the mirror being made possible by the switching-over of the line sweep.

It is naturally also possible, by changing the optical conditions, such as the space of the mirror from the screen, by changing the radius of curvature and consequently of the focal point, and by special curves, to view the images in different shapes, sizes and at any desired distances. In addition, the curvature of the television screen, having an unfavourable effect on the quality of the picture, can be compensated by the said features.

Figure 3:
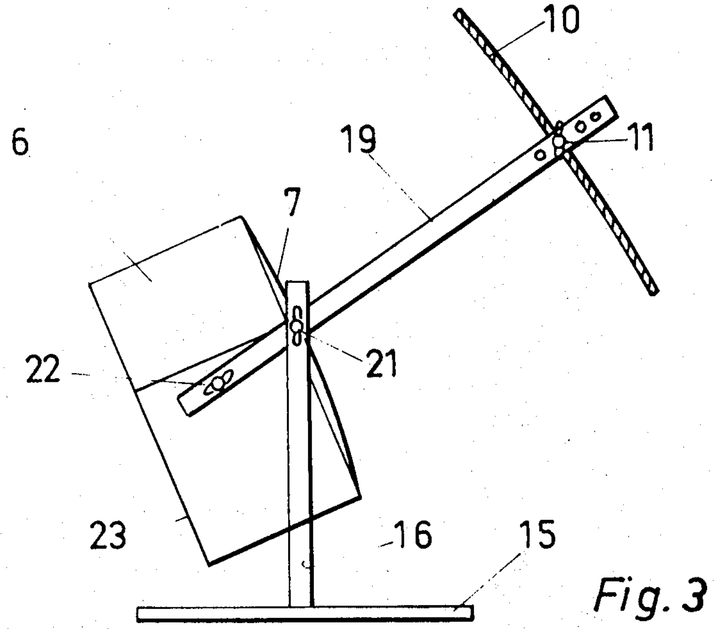
FIGS. 3 and 4 are a side view and a rear view, respectively, of the apparatus of the invention depicting a different embodiment of the construction of the apparatus of FIG. 1, based however on the same principles.
Figure 4:
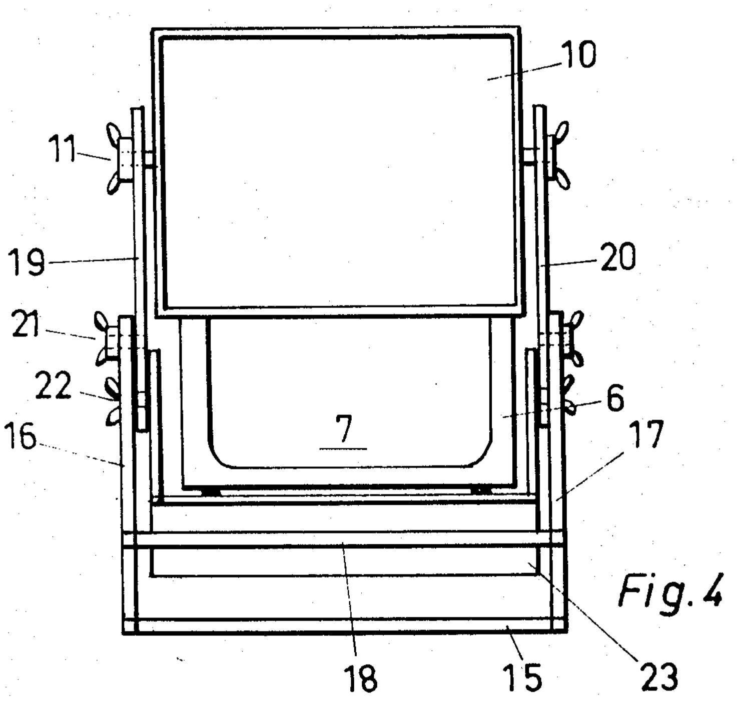

FIGS. 3 and 4 represent side and back views respectively of another embodiment of the device according to the present invention. In this embodiment the base comprises a closed frame 15 having two vertical supports 16 and 17 connected together by a cross bar 18. Two rods 19 and 20 are pivotable and lockable on the axis of rotation 21 on the vertical supports 16 and 17. A rocker 23 is mounted pivotably and lockably on a pair of levers on the rods at the centre of rotation 22. The rocker serves to receive the television receiver 6 which shown is firmly screwed thereto, for example. Journalled on the other pair of levers with means to control the distance of the mirror to the screen, pivotably and lockably at 11, is the rectangular spherical mirror 10. The length of the lever arms is calculated so that, on the one hand, the correct ratio of the distance from the screen to the mirror is obtained and on the other hand, a certain equilibrium of the entire arrangement can be achieved, whereby the supporting members can be formed comparatively light and simple.

Figure 5:
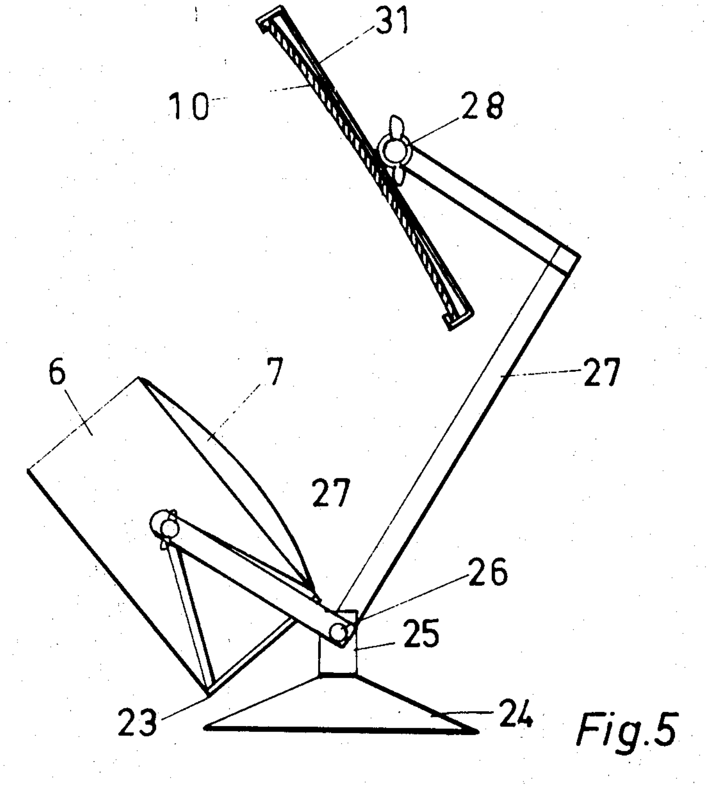
FIGS. 5 and 6 are a side view and a rear view, respectively, of the apparatus of the invention shown in the preceding figures depicting a different embodiment of the construction thereof based however on the same principles.
Figure 6:
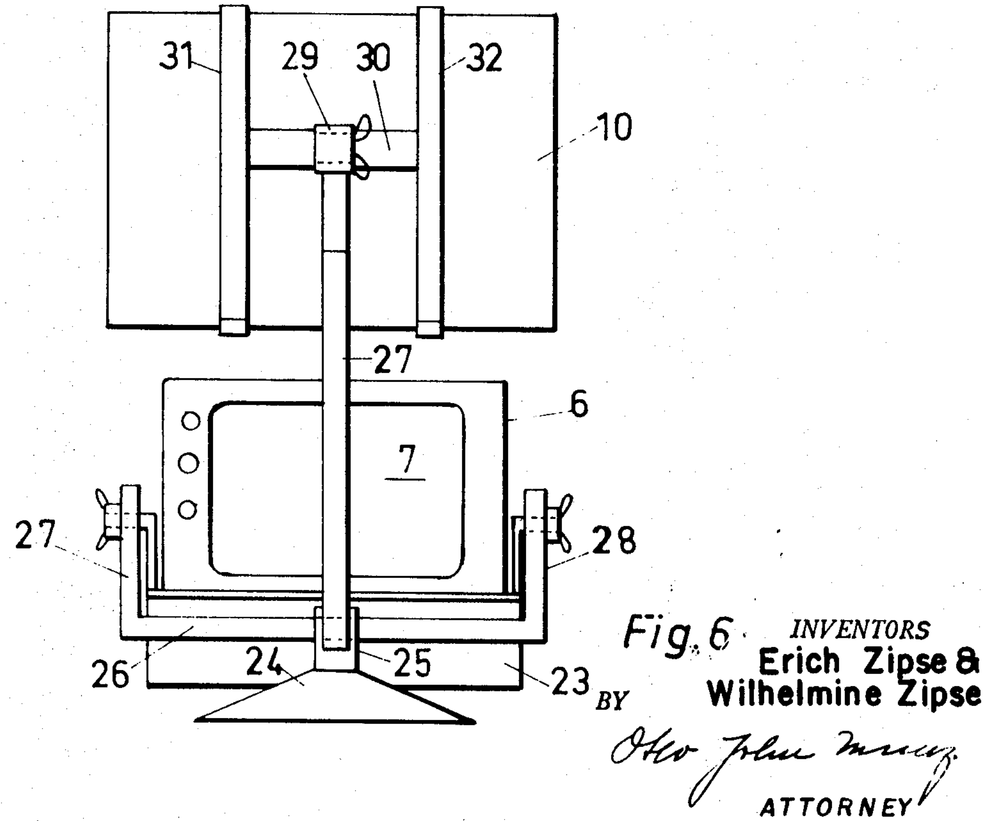

FIGS. 5 and 6 show another embodiment of the device according to the invention. A pin 25 is located journalled rotatably on the base 24. A cross bar 26, on which a longitudinal arm 27 is mounted, passes through the pin 25. Instead of one arm 27, two symmetrically arranged arms may be provided. The bar 26 also has two side struts 27 and 28 on which a rocker 23 is pivotably mounted. The television receiver 6 is arranged on this rocker 23.

The other end of the arm 27 is bent at an angle and has, at the upper end, a mounting device 28 for the mirror 10. The mounting device 28 consists of a joint 29 mounted on a transverse strut 30 having two longitudinal clamps 31 and 32 serving to support the mirror 10.

Figures 7, 7A:
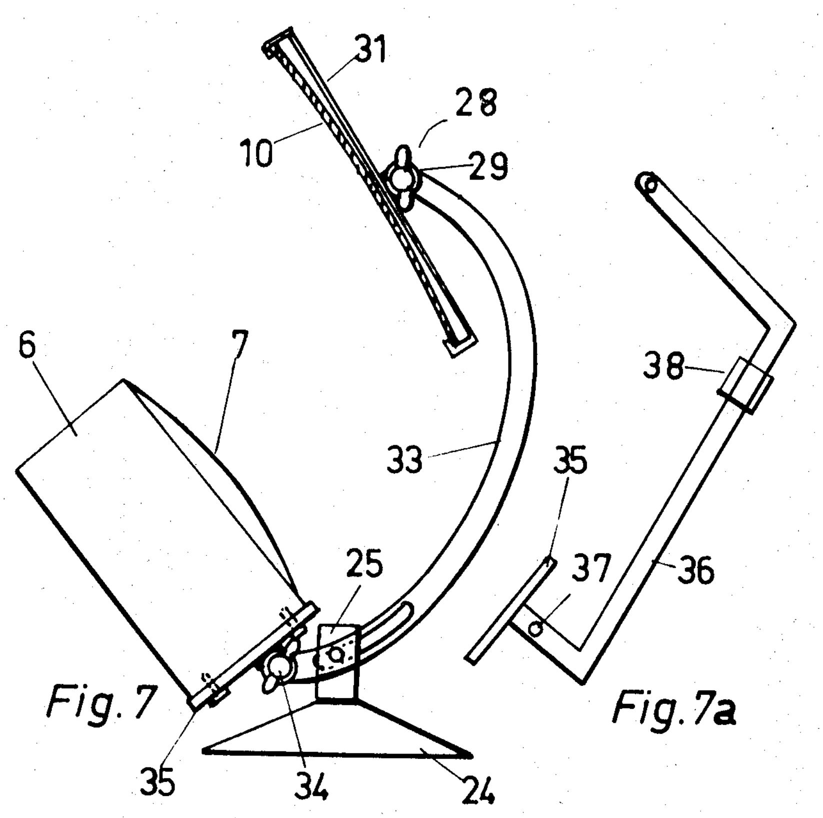
FIGS. 7 and 8 are a side view and a rear view, respectively, of the apparatus of the invention, the same as in the previous figures, depicting a different embodiment of the construction thereof, based on the same principles.
FIG. 7*a* is a side view of a different construction of a part of the apparatus depicted in FIGS. 7 and 8.
Figure 8:
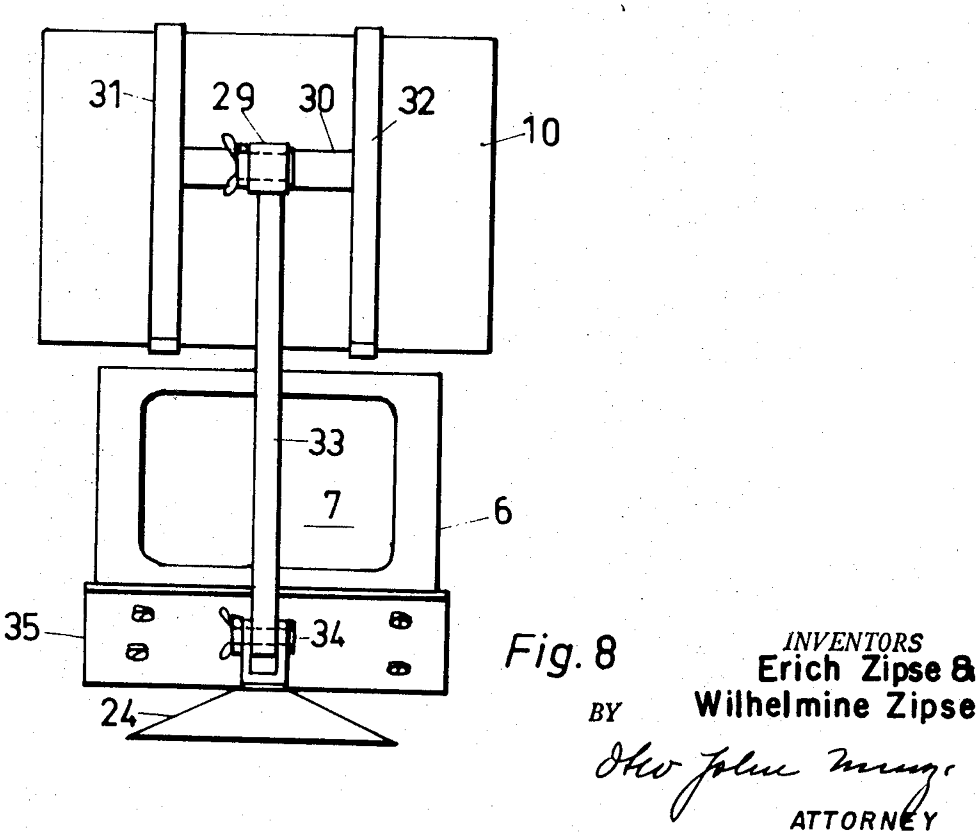

FIGS. 7, 7*a* and 8 show another embodiment of the invention. A curved arm 33 is pivotably mounted on the pin 25 which is journalled to rotate on the base 24. A plate 33, on which the television receiver can be screwed, is disposed at one end of the arm 33 on a joint 34. The other end of the curved arm 33 is also provided with a joint 29 on which the mirror is secured in the manner shown in FIGS. 5 and 6.

FIG. 7*a* shows an angled arm 36 which can be used instead of the arm 33 in FIG. 7. The attachment is effected on the bore 37 in the pin 25. In addition, the plate 35 is directly screwed or welded to the arm 36. In order to adapt the described arrangement to television receivers of different weight, a displaceable counterweight 38 is provided on the straight part of the arm 36.

Figure 9:
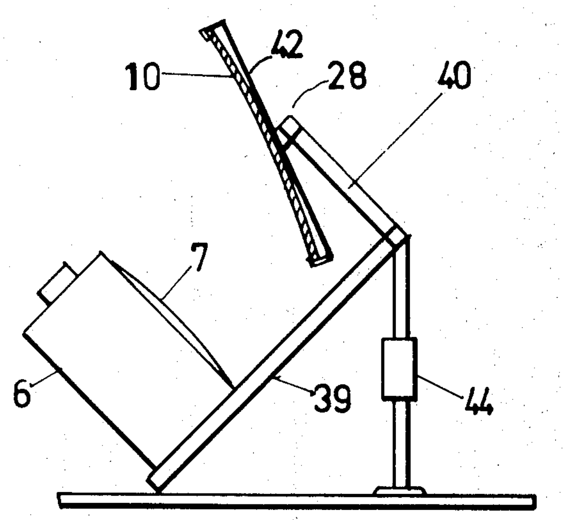
FIGS. 9 and 10 are still different detail constructive embodiments of the apparatus of the invention for small TV sets, based however on the same principles.
Figure 10:
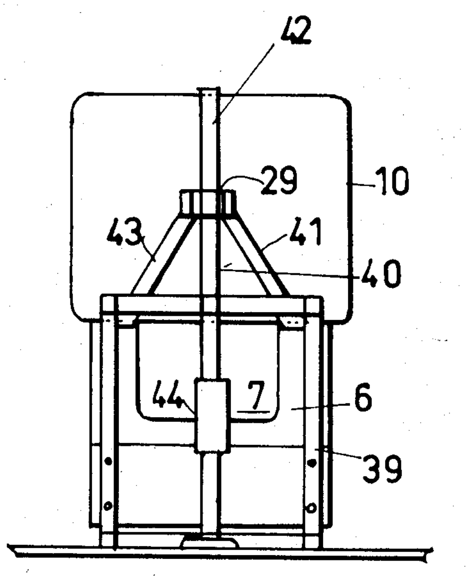

FIGS. 9 and 10 show two different views of another embodiment according to the invention which may be preferably used with smaller or portable television receivers. The embodiment illustrated comprises a base frame 39 on which the television receiver is screwed or secured by other clamping means. The frame 39 has an arm 40, on which a mounting device 28 is provided for the mirror 10. The mounting device comprises a joint 29 having three holding clamps 41, 42 and 43 secured thereto. In order to adjust the desired height, an adjusting device 44 is provided, comprising substantially a ram which is adjustable in height and rests on a base.

Figure 11:
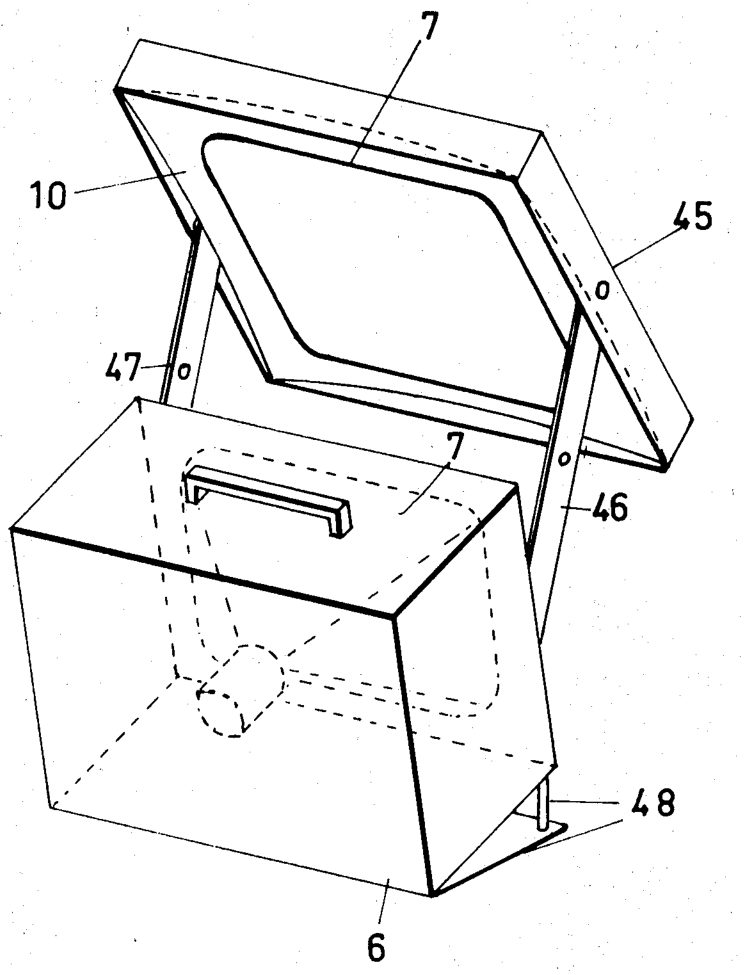
FIG. 11 is a perspective view of the apparatus of the invention for a portable TV set in still a different constructive embodiment, based however on the principles common with the previous embodiments shown.

FIG. 11 shows still another embodiment according to the invention in perspective. The embodiment illustrated comprises a portable television receiver 6 in form of a housing, on which a cap 45 is mounted by two arms 46 and 47. The arms 46 and 47 are connected to a base 49 and are movable pivotably in order to place the cap 45 on the housing of the portable television receiver. In the cap 45 is located the mirror 10 in which a visible image 7′ of the screen of the tube 7 is produced. When the cap 45 is in a closed position on the housing then the mirror 10 and the tube 7 is protected.

In all the embodiments illustrated it is advisable to provide the screen or its protective glass with a non-reflecting surface so that no reflections originating from the mirror 10 occur on the surface of the tube. In addition, in a special embodiment, a black border corresponding to the width of the mirror may be provided on the television receiver or the tube, which border may be formed if desired as a black concave edge. In this manner the floating impression of the image viewed in the mirror will be obtained more intense.

In order to avoid reflection on the glass of the tube a transparent plate may of course also be arranged between the tube and the mirror and ajusted at such an angle to the mirror that the image reflected therein can no longer be formed on the tube.

In order to complete and automatically adjust the receiver to suit the viewer, independently controllable electric motors may be provided for one or more rotary or pivotable movements, which motors, combined with suitable switch devices, permit the mirror and the television receiver to be adjusted from the viewing position of the viewer.

The following method is provided for the economic and inexpensive manufacture of a mirror for a device according to the present invention.

One or more spherical molds of metal or of any other material having a very high melting point, are placed in an electrically or gas-heated furnace. These molds may be lined with asbestos for safety. Suitably cut rectangular mirror glass plates are placed on these molds. The temperature in the furnace is exactly adjusted to the point at which the glass plates sufficiently soft to conform to the surface of the mold due to their own weight. The temperature point must be very accurately observed, for in any case flowing of the glass must be avoided. In that case streaks would occur greatly impairing the optical quality of the mirror. After very slow cooling, the curved mirror glass plates are removed from the furnace and provided with a deflecting covering in known manner on the spherical external side. The mirror can then be enclosed in a plastic frame.

It is of course also possible to cast the mirror with suitable compositions having a low heat expansion coefficient and then to provide it with a reflecting surface by polishing. It is also possible to use ground mirrors for the stated purpose, which, on account of the high processing costs, would very greatly increase the purchase price of the device. However, they have the special advantage that a perfect and completely undistorted reproduction of television pictures is achieved thereby.

What I claim is:

1. An accessory for mounting a television receiver and converting the screen image to a mirror reflected image having a three dimensional effect, the accessory being a single interconnected unit being self contained and compact comprising:

a support base;

means for mounting the receiver;

an elongated continuous arm;

pivotal means connecting an intermediate point of the arm to the support base for allowing angular variation of the arm with respect to the base;

means pivotally mounting a first end of the arm to the mounting means for permitting variation in the inclination of the receiver;

a concave mirror;

means pivotally mounting the holder to an oppositely disposed end of the arm for permitting the selection of a preselected reflection angle;

whereby the pivotal means mounting the first end of the arm to the mounting means is adjusted so that the screen image is projected toward the central portion of the mirror, and further whereby the pivotal mounting of the arm to the base allows selection of a preselected viewing elevation.

2. The structure set forth in claim 1 wherein the elongated arm comprises a U-shaped section connecting the receiver to the base, the section having a bight portion and outward end portions, the bight portion being pivotally mounted to the base and the outward end portions pivotally mounting the receiver, and fastener means connected at each pivotal means to releasably fix the respective pivotal means in preselected positions.

3. The structure set forth in claim 1 wherein the elongated arm comprises a one piece arcuate unit having a slot formed in an intermediate portion thereof, fastener means mounted in the base for effecting the pivotal mounting of the arm thereat, and fastener means connected at the pivotal means between the arm and the mirror holder as well as the arm of the receiver mounting means to releasably retain the respective pivotal means in a preselected position.

4. An accessory apparatus for conversion of a screen picture into a three-dimensional virtual viewers image comprising a housing including a cradle for a screen, an optical system, means to align said optical system optically with the center of said housing relative to the proposed viewing positions of expected viewers; means to project the said picture upon a concave mirror in optical alignment with and reflecting toward the viewer's position; means to change the said optical alignment, said optical system comprising means to locate optically the said virtual image behind and spaced a distance from said mirror within an imaginary plane intersecting with the surface of said mirror, said distance being determined by the radius of concavity of said mirror and by the distance of said mirror from said screen to create a desired three-dimensional depth effect, means to control the distance and angle of said mirror relative to said screen characterized by the feature that the surface of the concave mirror is pivotable relative to the surface of said screen, said surface corresponding to a part of a spherical surface having a large diameter greater than the distance between the center of said screen and the center of said mirror, said mirror being rectangular, the length of the rectangle of the mirror being greater than the width of the screen, the radius of curvature of the spherical surface of the mirror being proportionate to the diagonal of the screen, the ratio of the radius of curvature of the spherical surface of the mirror to the diagonal of the screen being constant and preferably ranges between 3 and 10 to 1, the ratio of the height of the mirror to the width thereof ranging between ⅓ and ¾, two arms being journalled to swing horizontally and pivot vertically by an angle joint, on a tripod, the arms supporting said adjustable mirror by means of a joint at their ends in the opposite direction of the arms, two other arms are provided on a transverse connected on which the television receiver is secured by means of a rocker in such manner that the receiver is adjustable at an angle relative to the mirror with a base and at least one upright connected to the base, a rocker mounted pivotably on said upright, said rocker provided with means to mount said screen thereto, at least one rod pivotably swingably and lockably mounted to said upright, said rod having at one end a longitudinal rocker holding extension and at its other end a longitudinal mirror holding extension and means to control the positions of said rocker distancewise, in angularly and radial directions.

5. An apparatus as claimed in claim 4, said at least one upright being a pair of parallel spaced uprights anchored in the common base, said at least one rod being a pair of rods, each said rod mounted to one said upright equidistantly spaced from said base and each other, and parallel to and on a common axis with each other, said rods formed as a balance frame and rotatably mounted on said base at their center of gravity, the mirror being secured to one end by means of a back support, and a plate, pivotably and lockably secured to the other end.

References Cited

UNITED STATES PATENTS

| | | | |
|---|---|---|---|
| 2,045,120 | 6/1936 | Carpenter. | |
| 2,285,509 | 6/1942 | Goshaw | 178—7.81 |
| 2,287,307 | 6/1942 | Herbst | 178—7.81 |
| 3,041,496 | 6/1962 | Creamer | 178—7.85 |
| 2,304,490 | 12/1942 | Yoder | 178—7.81 |
| 2,499,579 | 3/1950 | Fritsch | 178—7.81 |
| 2,977,412 | 3/1961 | Rhodes | 178—7.82 |
| 3,185,020 | 5/1965 | Thezen | 178—7.82 |

FOREIGN PATENTS

| | | |
|---|---|---|
| 559,676 | 3/1957 | Italy. |
| 583,761 | 10/1958 | Italy. |
| 720,633 | 11/1965 | Canada. |
| 868,118 | 5/1961 | Great Britain. |

ROBERT L. GRIFFIN, Primary Examiner

J. A. ORSINO, Jr., Assistant Examiner

U.S. Cl. X.R.

178—6.5, 7.85, 7.89; 350—144, 294; 352—86